(12) United States Patent
Blaettler et al.

(10) Patent No.: US 11,926,361 B2
(45) Date of Patent: Mar. 12, 2024

(54) STEERING COLUMN FOR A MOTOR VEHICLE

(71) Applicants: thyssenkrupp Presta AG, Eschen (LI); thyssenkrupp AG, Essen (DE)

(72) Inventors: Simon Blaettler, Grabs (CH); Sebastian Huber, Goefis (AT); Jean-Pierre Specht, Haag (CH); Tim Bayer, Luechingen (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 18/012,479

(22) PCT Filed: Jun. 29, 2021

(86) PCT No.: PCT/EP2021/067761
§ 371 (c)(1),
(2) Date: Dec. 22, 2022

(87) PCT Pub. No.: WO2022/002886
PCT Pub. Date: Jan. 6, 2022

(65) Prior Publication Data
US 2023/0257016 A1    Aug. 17, 2023

(30) Foreign Application Priority Data
Jul. 2, 2020   (DE) .................. 10 2020 117 447.0

(51) Int. Cl.
*B62D 1/185*    (2006.01)
*B62D 1/181*    (2006.01)

(52) U.S. Cl.
CPC ............. *B62D 1/185* (2013.01); *B62D 1/181* (2013.01)

(58) Field of Classification Search
CPC ........ B62D 1/185; B62D 1/181; B62D 1/183; F16H 2025/2081; F16H 2025/209
See application file for complete search history.

(56) References Cited

U.S. PATENT DOCUMENTS

2018/0319419 A1    11/2018  Kreutz et al.
2019/0301574 A1*   10/2019  Terada ................ F16H 25/2006
(Continued)

FOREIGN PATENT DOCUMENTS

DE        102015224602 A1    6/2017
DE        10 2017 207 561 A1  7/2017
(Continued)

OTHER PUBLICATIONS

English Translation of International Search Report issued in PCT/EP2021/067761, dated Oct. 4, 2021.

*Primary Examiner* — Drew J Brown
(74) *Attorney, Agent, or Firm* — thyssenkrupp North America, LLC

(57) ABSTRACT

An adjusting drive for a motor-adjustable steering column may include an outer threaded spindle that has an external thread that engages with a spindle nut and that has an internal thread that is engaged by an inner threaded spindle. The spindle nut, the outer threaded spindle, and the inner threaded spindle can be driven in rotation relative to one another about an axis by a motor-type drive unit. The adjusting drive may also include a blocking device that is switchable between a first position and a second position. In the first position the outer threaded spindle is locked together with the spindle nut for conjoint rotation. In the second position the outer threaded spindle is locked together with the inner threaded spindle for conjoint rotation.

14 Claims, 2 Drawing Sheets

(56) References Cited

U.S. PATENT DOCUMENTS

2021/0309277 A1  10/2021  Huber et al.
2021/0362768 A1  11/2021  Huber et al.

FOREIGN PATENT DOCUMENTS

DE    102018212696 B3 *  11/2019  ............ B62D 1/181
DE    102018212696 B3     11/2019
DE    102018217960 A1      4/2020
DE    112022000250 T5 *   9/2023
WO    WO-2016150434 A2 *  9/2016  ............ F16H 25/20

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2021/067761, filed Jun. 29, 2021, which claims priority to German Patent Application No. DE 10 2020 117 447.0, filed Jul. 2, 2020, the entire contents of which are incorporated herein by reference.

FIELD

The present disclosure generally relates to steering, including steering columns and adjusting drives for motor-adjustable steering columns of motor vehicles.

BACKGROUND

Steering columns for motor vehicles have a steering shaft with a steering spindle, to the rear end of which as viewed in a direction of travel, which end faces toward the driver, there is attached a steering wheel for the input of a steering command by the driver. The steering spindle is mounted, so as to be rotatable about its longitudinal axis, in a casing tube of a positioning unit that is held on the vehicle bodyshell by a supporting unit. By virtue of the fact that the positioning unit has at least one casing tube which is movable in telescopic fashion in the direction of the longitudinal axis in a casing unit, also referred to as guide box or boxed swingarm, which is connected to the supporting unit, the steering wheel can be adjusted longitudinally relative to the bodyshell. A vertical adjustment is possible by virtue of the positioning unit, or a casing unit that receives said positioning unit, being mounted pivotably on the supporting unit. The adjustment of the positioning unit in a longitudinal or vertical direction makes it possible to set an ergonomically comfortable steering wheel position relative to the driver's position in an operating position, also referred to as driving or operator control position, in which a manual steering intervention is possible.

In the case of motor-adjustable steering columns, it is known to provide a motor-type adjusting drive for adjustment purposes, which adjusting drive has a drive unit comprising an electrical drive motor, which drive motor drives a spindle mechanism with a threaded spindle that is screwed into a spindle nut. The threaded spindle and the spindle nut can be driven in rotation relative to one another about their common axis, the threaded spindle axis or spindle axis, by the drive unit, whereby the threaded spindle and the spindle nut can be moved toward one another or away from one another in translational fashion in the direction of the threaded spindle axis in a manner dependent on the direction of rotation. By virtue of the fact that the threaded spindle and the spindle nut are attached, so as to be supported in the direction of the axis, to parts of the steering column that are adjustable relative to one another, for example to casing tubes of a casing unit that are adjustable in telescopic fashion in an axial direction, or to a casing unit and to a supporting unit, a longitudinal or vertical adjustment is possible.

In an embodiment known as a plunger spindle drive, the threaded spindle is coupled non-rotatably, with respect to rotation about the axis, to a static part of the steering column, said part being for example the supporting unit, which is fixed to the bodyshell, or being the casing unit or a casing tube, and the spindle nut is supported, such that it can be driven in rotation, axially on a part of the steering column, which part is adjustable relative to said spindle nut. By virtue of the spindle nut being driven in rotation, a translational movement relative to the threaded spindle can be effected, whereby those parts of the steering column which are connected via the spindle mechanism can be adjusted relative to one another. A steering column having an adjusting drive of said type is described for example in DE 10 2017 207 561 A1.

Alternatively, in an embodiment known as a rotary spindle drive, the threaded spindle may be drivable in rotation relative to the steering column, and the spindle nut may be static with respect to rotation about the spindle axis.

In the case of a simple rotary or spindle drive, the maximum adjustment travel that can be implemented is limited by the length of the threaded spindle. In order to be able to implement greater adjustments, for example in order to stow the steering wheel outside the manual operator control or comfort range during autonomous driving operation, correspondingly long threaded spindles are required. To overcome this limitation, DE 10 2018 212 696 B3 has proposed a generic multi-stage adjusting drive with a telescopically nested arrangement of two spindle mechanisms. Here, a first or outer threaded spindle, hereinafter referred to as outer threaded spindle, is configured as a hollow spindle with an internal thread which is coaxial with respect to an external thread and which is engaged by an inner threaded spindle which is supported on the steering column for conjoint rotation. A first spindle mechanism is thus formed. The outer threaded spindle engages, by way of its external thread, with a spindle nut, also referred to as drive nut, which can be driven in rotation by the drive motor and which is supported axially on the drive unit. A second spindle mechanism is thus formed.

When the drive unit is activated, the spindle nut is rotated relative to the multi-stage arrangement of the two threaded spindles. By virtue of the fact that only the inner threaded spindle is provided with defined rotationally conjoint support, different operating states can arise in which the outer threaded spindle co-rotates either with the spindle nut, wherein the first spindle mechanism is active, or co-rotates with the inner threaded spindle, such that the second spindle mechanism is active, or else co-rotates partially simultaneously with the outer threaded spindle and with the inner threaded spindle, such that both spindle mechanisms are active. Here, the operating states that actually arise during the adjustment are dependent on the thread friction, which in turn is dependent on various parameters such as tolerances, temperature, surface properties and the like. A disadvantage of this is that, during adjustment, there is no definition with regard to which spindle mechanism is active when. The adjustment behavior can thus be haptically and acoustically impaired, in particular with the result that not every adjustment operation feels and/or sounds the same, because, during a first adjustment operation, first one and then the other spindle mechanism is activated, and during the subsequent adjustment operation, the sequence is reversed in relation to the aforementioned sequence. It has been found that vehicle drivers in particular of vehicles in the luxury segment perceive this to be disturbing, unpleasant and of insufficient quality. Furthermore, design freedom is restricted, because both spindle mechanisms must have the same transmission characteristics with regard to conversion of the relative rotation into an axial movement.

Thus a need exists to improve the adjustment behavior in particular with regard to haptics and acoustics, and to increase design freedom.

BRIEF DESCRIPTION OF THE FIGURES

FIG. 5 is an enlarged detail view as in FIG. 4 with a switch moving into a second position.

FIG. 6 is a detail view similar to FIG. 5 in the second position.

DETAILED DESCRIPTION

Figure 1:
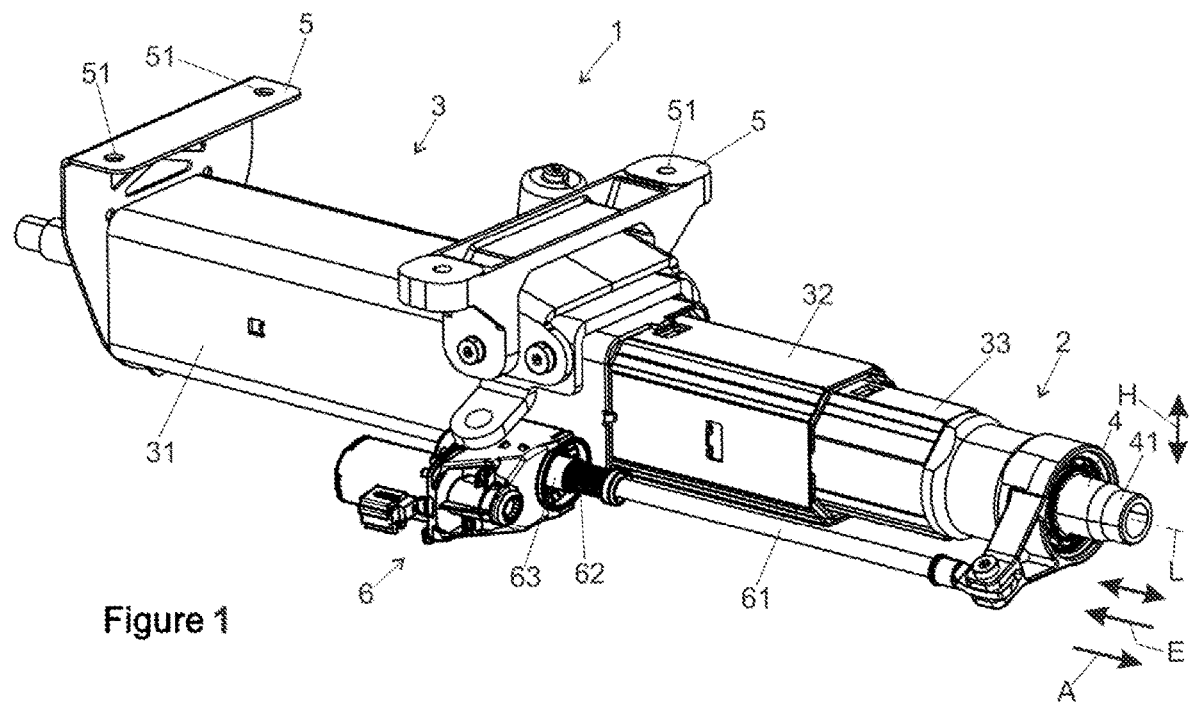
FIG. 1 is a schematic perspective view of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to an adjusting drive for a motor-adjustable steering column for a motor vehicle. In some examples, such an adjusting drive may include an outer threaded spindle, which outer threaded spindle has an external thread that engages with a spindle nut, and which outer threaded spindle has an internal thread that engages with an inner threaded spindle. The spindle nut, the outer threaded spindle and the inner threaded spindle can be driven in rotation relative to one another about an axis by a motor-type drive unit. The present disclosure furthermore generally relates to a steering column for a motor vehicle, and to a method for operating an adjusting drive.

In the case of an adjusting drive for a motor-adjustable steering column for a motor vehicle, comprising an outer threaded spindle, which outer threaded spindle has an external thread that engages with a spindle nut, and which outer threaded spindle has an internal thread that is engaged by an inner threaded spindle, wherein the spindle nut, the outer threaded spindle and the inner threaded spindle can be driven in rotation relative to one another about an axis by a motor-type drive unit, according to the invention, a blocking device that is switchable between a first position and a second position is provided, wherein, in the first position, the outer threaded spindle is locked together with the spindle nut for conjoint rotation, and in the second position, the outer threaded spindle is locked together with the inner threaded spindle for conjoint rotation.

By means of the blocking device according to the invention, in the case of a multi-stage adjusting drive, it is possible for selectively either the first or the second position to be adopted in a defined manner, whereby a respective operating mode of the multi-stage spindle mechanism is clearly and uniquely defined.

In the first position, also referred to as outer blocking position, which corresponds to a first operating mode, the outer threaded spindle is locked together with the spindle nut for conjoint rotation in both directions of rotation by means of the blocking device, such that rotationally conjoint coupling that acts in both directions of rotation is realized. This first position may be adopted for example in a stowage range of adjustment, referred to for short as stowage range, which refers to the range of adjustment between the stowage position and a comfort or operator control range of the steering column, and which is passed through in a forward adjustment direction during retraction into the stowage position or oppositely in a backward adjustment direction during deployment out of the stowage position. In both possible directions of rotation, and thus in both possible adjustment directions, the rotationally conjoint locking is maintained for as long as the first position is adopted, that is to say preferably over the entire stowage range.

In this first position, the spindle nut is driven in rotation, together with the outer threaded spindle that is coupled thereto, by means of the drive unit. In this way, only the first spindle mechanism, which is formed by the outer threaded spindle together with the inner threaded spindle, is active.

If the blocking device is switched from the first into the second position, which may also be referred to as inner blocking position, the rotationally conjoint connection between spindle nut and outer threaded spindle is released, and the inner threaded spindle is locked together with the outer threaded spindle for conjoint rotation, that is to say connected to said outer threaded spindle so as to be non-rotatable relative thereto, in both directions of rotation. In this way, the first spindle mechanism is deactivated, and the second spindle mechanism formed from the spindle nut and the outer threaded spindle is activated. When the spindle nut is driven in rotation, the outer threaded spindle together with the inner threaded spindle fixed therein is moved linearly and axially either in a forward or backward adjustment direction in a manner dependent on the direction of rotation. Throughout the range of adjustment covered by the second spindle mechanism, for example the comfort range of adjustment for adaptation of the operator control position of the steering wheel in the operator control range, the first spindle mechanism is blocked by the blocking device, and is inactive.

The invention permits, for the first time, controlled activation of either only the first or only the second spindle mechanism, for the purposes of adjustment, in the case of a multi-stage spindle mechanism. This yields the advantage that no undefined mixed operating mode can arise, as in the prior art, such that the adjustment behavior is considerably improved in relation to the prior art with regard to haptic and acoustic characteristics. The function is distinct and is independent of thread friction. A further major advantage results from the fact that the transmission ratios, which define the ratio between rotational and axial linear movement of the two spindle mechanisms, can be specified independently of one another. This is made possible in that, within an operating mode defined by the first or second position, no undefined superposition of the movements is possible as it is in the prior art. This allows greater design freedom, and it is thus possible, for example for a given rotational speed of the drive, to specify a faster adjustment in the stowage range, by way of a greater thread pitch, than in the comfort range.

The external thread of the outer threaded spindle and the internal thread of the outer threaded spindle are preferably coaxial with respect to one another.

In one advantageous refinement, provision may be made for the blocking device to interact with the spindle nut, the outer threaded spindle and the inner threaded spindle in order to be switched from the second position into the first position from a forward adjustment direction at a predetermined relative position, and in order to be switched from the first position into the second position from a backward adjustment direction, which is opposite to the forward adjustment direction, at the relative position. The relative position predetermined for the switch is also referred to as switching position. In this embodiment, the switching of the blocking device may take place automatically, when the steering column is retracted in the forward adjustment direction from the comfort range into the stowage range, and conversely when said steering column is deployed from the stowage range into the comfort range in the backward adjustment direction, in each case when the switching position is reached, or during the adjustment across the switching position. An actuation of the blocking device then takes place in each case as a result of the relative movement of the spindle nut with the outer threaded spindle and of the outer threaded spindle with the inner threaded spindle. For the purposes of actuation, suitable actuating means may be provided, which may for example have mechanical positive guides or the like. These may be designed and configured such that, during the adjustment within the comfort or stowage range, the blocking device is held in each case in the associated first or second position and cannot be switched. The switching may take place in positively controlled fashion into one or the other position when that relative position of the threaded spindles which is predetermined as a switching position is reached or overshot at the transition between the comfort range and stowage range in one or the opposite adjustment direction. An advantage is that, in this way, it is always the case that one of the two spindle mechanisms is assigned in a defined manner to one adjustment range, and therefore a uniquely defined sequence of the activation of the spindle mechanisms is established in automated fashion.

For example, the blocking device may have a locking element that is movable between the first position and the second position. The locking element can be selectively mechanically moved between the positions and thus switched. In the first position, said locking element connects the outer threaded spindle to the spindle nut for conjoint rotation, and in the second position, said locking element connects the outer threaded spindle to the inner threaded spindle for conjoint rotation. A movable locking element can be implemented in functionally reliable form with little outlay.

The locking element preferably has a control surface which interacts with a counterpart control surface and which forms a control mechanism of similar nature to a cam-follower mechanism. One or more counterpart control surfaces may be provided. The counterpart control surface may preferably be provided on the inner threaded spindle and/or on the spindle nut. Said control mechanism of similar nature to a cam-follower mechanism transfers the locking element from the first position into the second position or vice versa.

One advantageous refinement may be that the locking element is mounted movably on the outer threaded spindle and can be selectively placed in locking engagement with a locking receptacle of the spindle nut or a locking receptacle of the inner threaded spindle. Here, the locking element is mounted and axially supported on the outer threaded spindle. Said locking element is moved conjointly with the outer threaded spindle during a relative movement, and, at a relative position established in each case as a switching position, can engage with one of the locking receptacles for the purposes of generating an axial form fit. For example, said locking element may, in the first position, protrude radially outward so as to engage in form-fitting fashion, from the inside in the spindle nut, into a locking receptacle, referred to as the outer locking receptacle. In order to be moved into the second position, said locking element is moved radially inward transversely with respect to the axis, so as to engage in form-fitting fashion into the locking receptacle arranged on the outside of the inner threaded spindle, referred to as the inner locking receptacle. A locking element can be formed in a simple and reliable manner as a mechanical blocking member of said type, wherein the form-fitting connection can be implemented in a mechanically simple manner and has a stable blocking action. A further advantage is that the locking element can be accommodated in space-saving and protected fashion between the inner threaded spindle and the spindle nut.

A locking receptacle may for example have a depression formed in the spindle nut and/or in the inner threaded spindle. The depression may be formed simply by a cutout, opening, groove or the like which is delimited in an axial direction and into which a locking element can be introduced in a radial direction in order to form a form-fitting connection that acts in an axial direction. Such a depression can be formed with little outlay, for example radially from the inside in the region of the internal thread of the spindle nut, or radially from the outside in the region of the external thread of the inner threaded spindle. The depressions preferably have the counterpart control surface or the counterpart control surfaces.

In one advantageous embodiment, it is possible for the locking element to be arranged in an aperture of the outer threaded spindle. The aperture extends radially through the outer threaded spindle, and forms an opening that passes through radially between the inner threaded spindle and the spindle nut. The locking element is mounted in axially supported and radially movable fashion in said aperture. The locking element may for example have a ball as a locking body, which ball is dimensioned such that, in every operating mode, it protrudes radially either inward or outward from the outer threaded spindle. Said locking element can thus assume only two operating positions, wherein, in the first position, said locking element engages with the outer locking receptacle from the inside, and in the second position, said locking element engages with the inner locking receptacle from the outside. By virtue of the fact that the locking body has an undersize, for example the ball has a relatively small diameter, in relation to the cross section of the aperture, said ball can be easily moved back and forth in the aperture for the purposes of switching between the first and the second position. This embodiment of the blocking device can be implemented in extremely simple and at the same time reliable and space-saving form.

In order to be able to effect automatic switching of the blocking device during the adjustment, provision may be made for the spindle nut to have a first actuating means, which is configured to switch the locking element from the first into the second position, and for the inner threaded spindle to have a second actuating means, which is configured to switch the locking element from the second into the first position. At a specified relative position, the switching position, during an axial relative movement of the spindle nut with respect to the outer threaded spindle, the first actuating means effects a radial movement for the purposes of switching the locking element, and, at a specified relative position during an axial relative movement of the outer threaded spindle with respect to the inner threaded spindle, the second actuating means effects a radial movement for the purposes of switching the locking element in the opposite direction. An actuating means may for example comprise a switching bevel which is inclined in an axial direction relative to the axis and by means of which, owing to the wedge effect, an axial relative movement causes a radial movement for the purposes of switching the locking element, for example a radial movement of a ball that is arranged in an aperture of the outer threaded spindle.

It is possible for the outer threaded spindle to have a delimiting means that can be caused to abut in an axial direction against the spindle nut. The delimiting means may have an axial stop, for example a projection or an annular collar, which protrudes radially outward beyond the external thread and which, as an end stop, can abut axially against the spindle nut when the maximum possible adjustment is reached. In particular, the stop position may coincide with the abovementioned relative position in which the blocking device is situated in the second position, in which the inner and outer threaded spindles are locked together for conjoint rotation, and coupled to one another in form-fitting fashion in both directions of rotation, by means of the locking element.

The invention advantageously makes it possible for the external thread of the outer threaded spindle to have a different pitch than the internal thread of the outer threaded spindle. For example, provision may be made for the internal thread to have a greater pitch than the external thread. In this way, the first spindle mechanism has a relatively high transmission ratio, such that, as described above, for a given rotational speed of the drive, a fast adjustment movement can be generated in the stowage range. For this purpose, the inner threaded spindle may for example have a multi-turn steep-lead-angle thread. By contrast, by means of a relatively small pitch of the external thread of the outer threaded spindle, a slower and more precise adjustment is possible in the comfort range. This greatly increases the design freedom for the adaptation of the adjusting drive to the individual requirements.

In one advantageous refinement, provision may be made for the spindle nut and/or the outer threaded spindle and/or the inner threaded spindle to comprise or be formed from a plastic.

It is advantageously possible for at least one of the threads to be of self-locking design. By virtue of the external thread of the outer threaded spindle being self-locking in the comfort range by way of a relatively small thread pitch, for example, it can be ensured that even high axial forces acting on the adjusting drive do not cause an adjustment of the set steering wheel position.

The invention furthermore comprises a steering column for a motor vehicle, comprising an adjusting drive, which adjusting drive has one or more of the features described above, and which adjusting drive is arranged between casings or casing tubes, which are adjustable axially relative to one another in telescopic fashion and which rotatably bear a steering spindle, of a casing unit, and/or which adjusting drive is arranged between a supporting unit, which is connectable to the bodyshell of the motor vehicle, and a casing unit, which rotatably receives a steering spindle. A longitudinal adjustment in the direction of the longitudinal axis of the steering spindle can be implemented by means of the telescopic adjustment of the casing tubes, and a vertical adjustment can be implemented by means of the arrangement between supporting unit and casing unit. Longitudinal and vertical adjustment may be provided individually or in combination. Advantages resulting from the use of the adjusting drive according to the invention are that an improved, defined adjustment can be achieved, for example with different adjustment characteristics in the comfort or operator control range and in the stowage range, and greater design freedom is made possible in the design process.

The invention furthermore relates to a method for operating an adjusting drive according to the invention according to the embodiments described above, comprising an outer threaded spindle, which outer threaded spindle has an external thread that engages with a spindle nut, and which outer threaded spindle has an internal thread that is engaged by an inner threaded spindle, wherein the spindle nut, the outer threaded spindle and the inner threaded spindle can be driven in rotation relative to one another about an axis by a motor-type drive unit, in which method, according to the invention, in a first range of adjustment, the so-called stowage range, the outer threaded spindle is locked together with the spindle nut for conjoint rotation, and the outer threaded spindle is driven in rotation relative to the inner threaded spindle, and, in a second range of adjustment, the comfort adjustment range, the outer threaded spindle is locked together with the inner threaded spindle for conjoint rotation, and the spindle nut is driven in rotation relative to the outer threaded spindle.

The embodiments and method steps described above with regard to the adjusting drive according to the invention and with regard to the steering column may be applied individually or in combination in the method according to the invention. By means of the defined selective locking of spindle nut and outer threaded spindle, or of outer threaded spindle and inner threaded spindle, it is possible to realize a better-defined adjustment characteristic than in the prior art. Further advantages are greater design freedom and increased ease of operator control and user-friendliness. Furthermore, owing to the better-defined movement sequence during the adjustment, the level of certainty for vehicle occupants can be increased.

The method may preferably be implemented in that, for the transition between the first and the second range of adjustment, a locking device is switched between a first and a second position, and vice versa. Refinements may for example be implemented as described above for the adjusting drive.

The method for adjusting one or more adjusting drives may advantageously be used for adjusting a steering column, for example for longitudinal and/or vertical adjustment.

FIG. 1 shows a steering column 1 according to the invention in a perspective view obliquely from the rear in relation to the direction of travel. Said steering column comprises a positioning unit 2 for the input of steering commands, which positioning unit has a casing unit 3 with three casing tubes 31, 32, 33, specifically an outer casing tube 31, an intermediate casing tube 32 and an inner tube 33. The casing tubes 31, 32 and 33 are arranged coaxially one inside the other and so as to be telescopically movable in a longitudinal direction, which corresponds to the axial direction of a longitudinal axis L, as indicated by the double arrow. Here, one adjusting direction, in which the casing tubes 31, 32, 33 are moved forward with respect to the direction of travel and collapsed into one another, that is to say are retracted, in order to shorten the positioning unit 2 into the stowage position, is referred to as the retraction direction E, which is referred to synonymously as forward adjustment direction E. Correspondingly, the adjusting direction that is opposite to this, in which the casing tubes 31, 32, 33 are moved apart in the direction of an operator control position from the stowage position, that is to say are deployed, is the deployment direction A or backward adjustment direction A, as indicated by the respective arrows.

A steering spindle 4 is mounted in the casing unit 3 so as to be rotatable about the longitudinal axis L, which steering spindle, at its rear end, has an attachment portion 41 for the attachment of a steering wheel (not illustrated). The steering spindle 4 is likewise designed to be telescopable in an axial direction for the purposes of longitudinal adjustment.

The casing unit 3 is held in a two-part supporting unit 5, which has fastening means 51 for attachment to a vehicle bodyshell (not illustrated).

Figure 2:
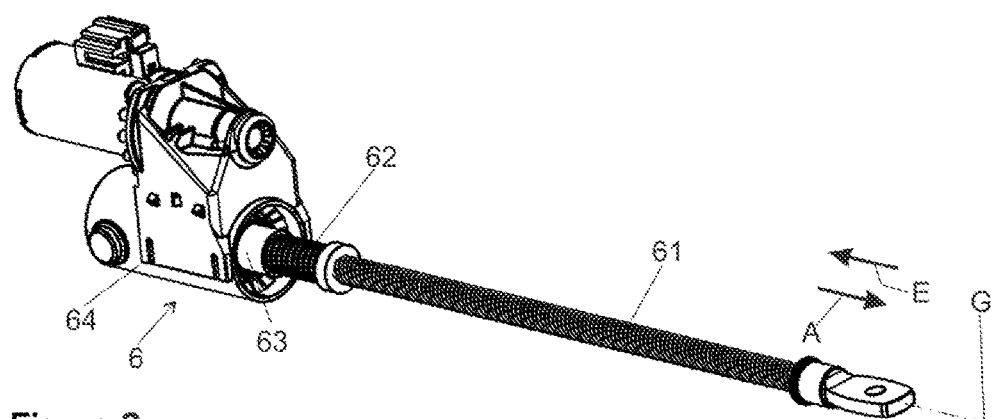
FIG. 2 is a schematic perspective view of an example adjusting drive of a steering column.
Figure 3:
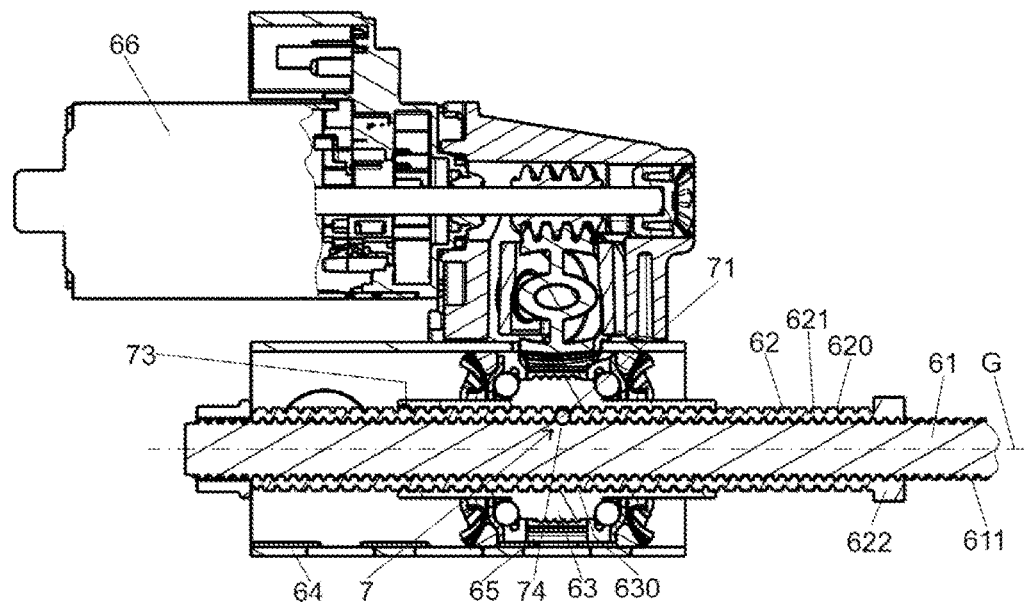
FIG. 3 is a longitudinal sectional view through the adjusting drive as per FIG. 2 along a spindle axis.
Figure 4:
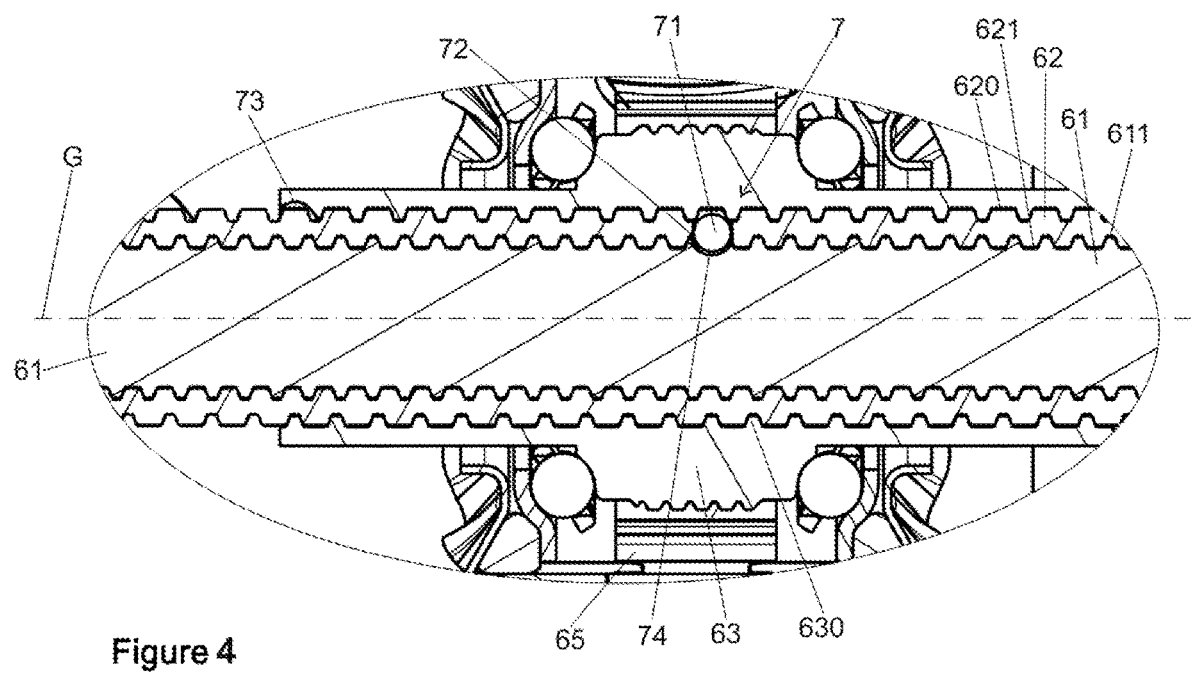
FIG. 4 is an enlarged detail view of FIG. 3 in a first position.

An adjusting drive 6, which is shown on its own in FIG. 2, serves for the relative longitudinal adjustment of the casing tubes 31, 32 and 33 and has an inner threaded spindle 61 and an outer threaded spindle 62, which extend coaxially in the direction of an axis G, the spindle axis, and has a spindle nut 63. FIG. 3 shows a longitudinal section along said axis G, and FIGS. 4, 5 and 6 show enlarged detail views therefrom.

The outer threaded spindle 62 is designed as a tubular hollow spindle and has an external thread 620 and an internal thread 621 coaxial with respect to said external thread. The inner threaded spindle 61 has an external thread 611 by way of which said inner threaded spindle engages with the internal thread 621 and thus forms a first spindle mechanism with the outer threaded spindle 62.

The outer threaded spindle 62 is screwed by way of its external thread 620 into an internal thread 630 of the spindle nut 63, and together with the latter forms a second spindle mechanism which is nested and arranged operatively axially in series with said first spindle mechanism.

The spindle nut 63 is mounted rotatably in the housing of a drive unit 64 so as to be rotatable about the axis G and is fixedly connected to a gearwheel 65 which, for example, as in the example shown, has a toothed ring that is connected coaxially and fixedly to the spindle nut 63. The gearwheel 65 together with the spindle nut 63 can be driven in rotation about the axis G by an electric motor 66 for the purposes of realizing the motor-imparted drive of the spindle mechanisms.

The inner threaded spindle 61 is connected to the casing tube 33 fixedly with respect to rotation about the axis G, that is to say non-rotatably with respect to the adjusting drive 6.

A blocking device 7 according to the invention has a locking element which is configured as a ball 71 and which is received with play in a radial aperture 72 of the outer threaded spindle 62 and which is held so as to be movable transversely with respect to the axis G but so as to at the same time be supported axially. The aperture 72 may be configured as a circular bore with an inner diameter greater than the diameter of the ball 71. The diameter of the ball 71 is dimensioned such that the ball 71 protrudes either radially inward or radially outward beyond the outer threaded spindle 62.

The inner threaded spindle 61 has, on the outside, a radial depression 74, which forms an inner locking receptacle with which the ball 71 can engage by being displaced inward, as can be seen in FIG. 4. The depression 74 is then connected in form-fitting fashion to the aperture 72 by means of the ball 71. The blocking device 7 thus assumes a second position, in which the inner threaded spindle 61 is locked together with the outer threaded spindle 62 for conjoint rotation, and connected thereto for conjoint rotation, by way of the form fit. The blocking device 7 thus assumes the second position (FIG. 4).

The spindle nut 63 has, on the inside, in the region of its internal thread 630, a radial depression 73, which forms an outer locking receptacle with which the ball 71 can engage in form-fitting fashion by being displaced outward, as can be seen in FIG. 4. The depression 73 is connected in form-fitting fashion to the aperture 72 by means of the ball 71. The blocking device 7 thus assumes a first position, in which the outer threaded spindle 62 is locked together with and connected to the spindle nut 63 for conjoint rotation by way of the form fit. The blocking device 7 thus assumes the first position (FIG. 6).

At one end, the outer threaded spindle 62 has a stop 622 in the form of a projection or collar which protrudes radially outward beyond the external thread and which can abut axially against the spindle nut 63 when the outer threaded spindle 62 has been retracted to a maximum extent in the retracting adjustment direction E (forward adjustment direction), see FIG. 6.

FIGS. 3 and 4 show, by way of example, an adjustment situation in which the steering column is situated in the comfort or operator control range in which the casing tubes 31, 32, 33 have been deployed in the longitudinal direction. If the spindle nut 63 is driven in rotation, the outer threaded spindle 62 is driven along linearly in the forward adjustment direction E. The adjustment speed is determined by the pitch of the internal thread 630 and of the corresponding external thread 620. Here, the inner threaded spindle 61 is, as shown in FIG. 4, locked by means of the locking device 7 for conjoint rotation in such a way that said inner threaded spindle is moved and adjusted linearly together with the outer threaded spindle 62.

At the end of the comfort range, the stop 622 abuts axially against the spindle nut 63 and stops the linear movement of the outer threaded spindle 62 relative to the spindle nut 63. Here, the switching position shown in FIG. 5 is reached, in which the two depressions 73 and 74 are situated radially opposite one another in the region of the aperture 72.

Thus, in the switching position, the ball 71 can move out of the inner depression 74 and, as indicated in FIG. 5 by the arrow, move outward in the aperture 72 until said ball engages in form-fitting fashion into the outer depression 73, as illustrated in FIG. 6. The locking for conjoint rotation between inner threaded spindle 61 and outer threaded spindle 62 is thus released, and the blocking device 7 is switched into a first position, in which the outer threaded spindle 62 is then locked together with the spindle nut 63 for conjoint rotation.

If the spindle nut 63 is driven in rotation further, the outer threaded spindle 62 rotates together with said spindle nut, and the inner threaded spindle 61 is adjusted linearly with respect to the outer threaded spindle. Here, the adjustment speed is determined by the pitch of the internal thread 621 and of the corresponding external thread 611. By virtue of the fact that this pitch can be greater than the pitch of the thread between outer threaded spindle 62 and spindle nut 63, it is possible, for a given rotational speed of the drive unit 64, to implement a faster adjustment in the stowage range until the front stowage position is reached.

The depressions 73 and 74 may have actuating bevels that are inclined in an axial direction, such that the ball 71, as it passes through the switching position shown in FIG. 5, is automatically moved inward or outward in order to effect a switch between the first and the second position or vice versa in a manner dependent on the adjustment direction.

LIST OF REFERENCE DESIGNATIONS

1 Steering column
2 Positioning unit
3 Casing unit
31 Outer casing tube
32 Intermediate casing tube
33 Inner casing tube
4 Steering spindle
41 Attachment portion
5 Supporting unit
51 Fastening means
6 Adjusting drive
61 Inner threaded spindle
610 External thread
62 Outer threaded spindle
620 External thread
621 Internal thread
622 Stop
63 Spindle nut
630 Internal thread
64 Drive unit
65 Gearwheel
66 Motor
7 Blocking device
71 Ball (locking element)
72 Aperture
73, 74 Depression
L Longitudinal axis
G Axis (spindle axis)
E Forward adjustment direction (retraction adjustment direction)
A Backward adjustment direction (deployment adjustment direction)

What is claimed is:

1. An adjusting drive for a motor-adjustable steering column for a motor vehicle, comprising:
    an outer threaded spindle having an external thread that engages with a spindle nut, the outer threaded spindle having an internal thread that is engaged by an inner threaded spindle;
    a motor-type drive unit that is configured to drive the spindle nut, the outer threaded spindle, and the inner threaded spindle in rotation relative to one another about an axis; and
    a blocking device that is switchable between a first position and a second position, wherein in the first position the outer threaded spindle is locked together with the spindle nut for conjoint rotation, wherein in the second position the outer threaded spindle is locked together with the inner threaded spindle for conjoint rotation.

2. The adjusting drive of claim 1 wherein the blocking device interacts with the spindle nut, the outer threaded spindle, and the inner threaded spindle to be switched from the second position into the first position from a forward adjustment direction at a predetermined relative position and to be switched from the first position into the second position from a backward adjustment direction that is opposite the forward adjustment direction, at the relative position.

3. The adjusting drive of claim 1 wherein the blocking device includes a locking element that is movable between the first position and the second position.

4. The adjusting drive of claim 3 wherein the locking element is mounted movably on the outer threaded spindle and is selectively positionable in locking engagement with a locking receptacle of the spindle nut or with a locking receptacle of the inner threaded spindle.

5. The adjusting drive of claim 4 wherein the locking receptacle includes a depression formed in the spindle nut and/or in the inner threaded spindle.

6. The adjusting drive of claim 3 wherein the locking element is disposed in an aperture of the outer threaded spindle.

7. The adjusting drive of claim 3 wherein the spindle nut has a first actuating means that is configured to switch the locking element from the first position into the second position, wherein the inner threaded spindle has a second actuating means that is configured to switch the locking element from the second position into the first position.

8. The adjusting drive of claim 1 wherein the outer threaded spindle includes a delimiting means that is configured to abut in an axial direction against the spindle nut.

9. The adjusting drive of claim 1 wherein the external thread of the outer threaded spindle has a different pitch than the internal thread of the outer threaded spindle.

10. The adjusting drive of claim 9 wherein the internal thread has a greater pitch than the external thread.

11. The adjusting drive of claim 9 wherein at least one of the external thread or the internal thread is self-locking.

12. A steering column for a motor vehicle comprising the adjusting drive of claim 1, wherein the adjusting drive is at least one of:
    disposed between casing tubes of a casing unit that are adjustable axially relative to one another in telescopic fashion and that rotatably bear a steering spindle; or
    disposed between a supporting unit that is connectable to a bodyshell of the motor vehicle and a casing unit that rotatably receives a steering spindle.

13. A method for operating the adjusting drive of claim 1 wherein in a first range of adjustment the outer threaded spindle is locked together with the spindle nut for conjoint rotation and the outer threaded spindle is driven in rotation relative to the inner threaded spindle, wherein in a second range of adjustment the outer threaded spindle is locked together with the inner threaded spindle for conjoint rotation and the spindle nut is driven in rotation relative to the outer threaded spindle.

14. The method of claim 13 wherein for a transition between the first range of adjustment and the second range of adjustment the method comprises switching a locking device between a first position and a second position.

* * * * *